No. 632,527. Patented Sept. 5, 1899.
G. W. HEY.
MARKING APPARATUS.
(Application filed Sept. 17, 1884.)

(No Model.) 4 Sheets—Sheet 1.

Witnesses.
Wm. C. Raymond
C. Bendixon

Inventor.
George W. Hey
per Duell, Laass & Hey
his Attys

THE NORRIS PETERS CO., PHOTO-LITHO., WASHINGTON, D. C.

No. 632,527. Patented Sept. 5, 1899.
G. W. HEY.
MARKING APPARATUS.
(Application filed Sept. 17, 1884.)
(No Model.) 4 Sheets—Sheet 2.

No. 632,527. Patented Sept. 5, 1899.
G. W. HEY.
MARKING APPARATUS.
(Application filed Sept. 17, 1884.)
(No Model.) 4 Sheets—Sheet 3.

Witnesses
Inventor.

No. 632,527.  
G. W. HEY.  
MARKING APPARATUS.  
(Application filed Sept. 17, 1884.)

(No Model.)

Patented Sept. 5, 1899.

Witnesses  
C. Bendixon  
A. F. Walz

Inventor  
George W. Hey  
Per Duell, Laass & Hey  
Attorneys

THE NORRIS PETERS CO., PHOTO-LITHO., WASHINGTON, D. C.

UNITED STATES PATENT OFFICE.

GEORGE W. HEY, OF SYRACUSE, NEW YORK, ASSIGNOR TO THE INTERNATIONAL POSTAL SUPPLY COMPANY, OF NEW YORK.

MARKING APPARATUS.

SPECIFICATION forming part of Letters Patent No. 632,527, dated September 5, 1899.

Application filed September 17, 1884. Serial No. 143,259. (No model.)

*To all whom it may concern:*

Be it known that I, GEORGE W. HEY, of Syracuse, in the county of Onondaga, in the State of New York, have invented new and useful Improvements in Marking Apparatus, of which the following, taken in connection with the accompanying drawings, is a full, clear, and exact description.

This invention relates to a certain new and useful machine for automatically stamp-canceling and postmarking letters or other mail-matter and to certain peculiarities of the construction and arrangement of the same, substantially as will be hereinafter more fully set forth and claimed.

In order to properly mark mail-matter, it is necessary to accurately define or locate the points where the marking-die commences and completes its impression, so that the postage-stamps will be canceled and the post or other marks applied in proper relation with each other.

The primary object of my invention is to provide mechanism which will act positively and mechanically upon each piece of mail-matter presented by a suitable feed, so that the stamps are canceled and the other marks applied accurately and invariably regardless of the differences in the dimensions or qualities of the separate pieces of mail-matter or of other variations in their condition. I secure this necessary result by the means hereinafter described and by taking advantage of the fact that the stamps upon envelops, postal cards, &c., are universally placed on the upper right-hand corner near the edge.

The proper relation of the printing or marking die to the stamp to be canceled or part of the letter to which the mark is to be applied will be designated throughout this application as the "registration of the die."

Before my invention mail-marking machines have not been successful in practical operation for the reason that no mechanism was provided to insure the registration of the die. In all such prior machines the registration of the die depended solely on the accurate, certain, and perfect supply of the mail-matter to the die by the feed mechanism alone at the exact instant the die was in position to make the proper print. In such constructions also the die could only print or was only in position to print when the feed mechanism reached a certain invariable point in its movement, the theory being that when the feed mechanism reached this point it would have inevitably carried the individual piece of mail-matter next to be marked to its proper position relative to the printing-die, so that upon the further operation of the machine the stamp would be canceled or other proper print made. Actual practice has demonstrated that this theory is entirely erroneous and that such a construction is wholly impracticable. The great variation in the dimensions and qualities of the individual pieces of mail-matter make it impossible to secure a perfectly-uniform feed which will invariably present the mail-matter at the printing-point in proper time to register with the die. Moreover, if the feed slips on the letter to be canceled or for any other reason fails to present the letter at the printing-point at the proper time it is manifest that when the feed reaches the point before referred to when the print immediately follows that the letter will not be in proper position to register with the die and that consequently the stamp will not be necessarily canceled, although the canceling-print might be made on the envelop or directly on the impression member. In the latter case the next piece of mail-matter would receive what printers term an "offset" and would not only be not properly marked, but would be smeared on its opposite side. The same result manifestly follows when for various reasons the feed engages the letter to be canceled either too far away from or too near its front edge. The vital defect, therefore, in these prior constructions is that no means for controlling or insuring the registration of the mail-marking die is provided. My invention differs from such constructions in that for the first time I have provided means for controlling the registration of the die, so that the proper marking of the mail-matter is insured regardless of the variations in the dimensions of the individual pieces or whether the feed mechanism slips on the mail-matter, moves it irregularly, or in any uncertain or unexpected manner. In my machine no matter how a letter may be fed, whether fast or slow, no matter how irregular the feed may become the marking member maintains the proper registration of the die.

Another important feature of my invention is a mechanism for insuring the same speed for the marker as the mail-matter being marked independently of the speed of the feed mechanism.

It is to be distinctly understood that the features above referred to are my invention considered in the broadest manner, as I have clearly indicated by the claims attached to this specification.

In the form of my invention shown in this application I feed the mail-matter to the machine with the stamped end extended toward the marking-die, and the letter itself from its front or advancing edge, which universally bears substantially the same relation to the stamp, is utilized to time or gage the commencement of the action of the marking member to insure the proper registration of the die in a manner specifically pointed out hereinafter.

In order to enable others skilled in the art to which my invention pertains to make and use the same, I will now proceed to describe its construction and operation, referring to the accompanying drawings, in which—

Fig. 9 is a plan view of the same.

Figure 1:
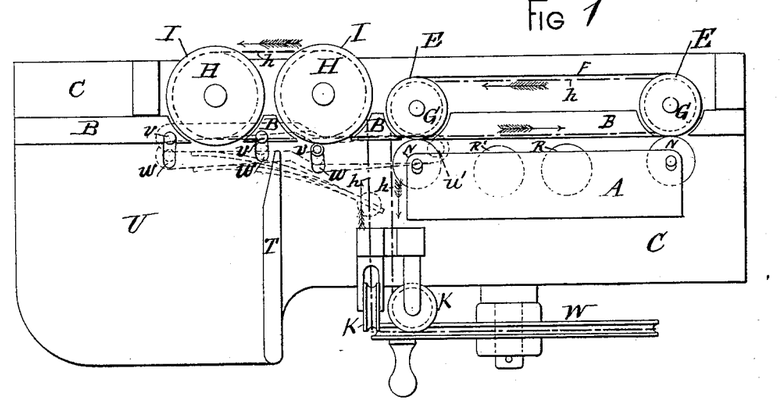
Figure 1 is a top plan view of my machine.

The letter-support of a machine embodying my invention may be of any suitable form or size. As shown, it comprises a letter-bed B and an endless supporting belt or apron F, moving over the same in the direction of the arrows, Fig. 1, the said belt or apron F being carried by rollers E E, journaled in suitable bearings in the letter-bed B. This belt or apron F is actuated by means of a driving-belt $h$, passed around the driving-pulley W and over the pulleys G G on the ends of the shafts of the rollers E. This belt also passes around the pulleys H H upon the shafts of two feeding-rollers I I, arranged upon the forward end of the bed, as shown. By the use of the idlers K K the driving-belt is directed so that the feed-rollers I I and the belt F will move together and in the same direction, thus forming a continuous letter-feed, as will be evident from the drawings. In order to give them a hold upon the letters to be fed, I prefer to face the feed-rollers I with rubber or similar frictional material, and am thus enabled to insure a more positive feed of the letters to the marking devices.

Figure 4:
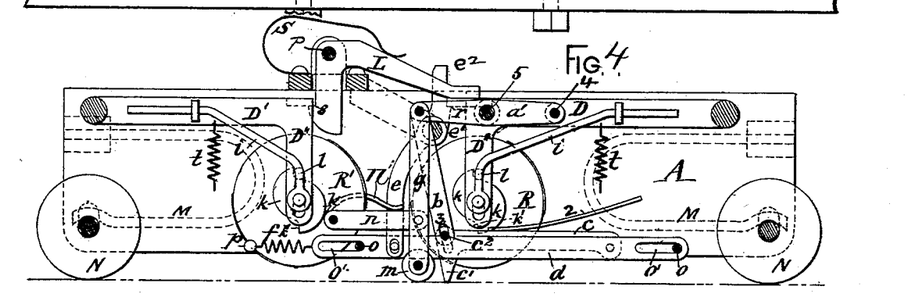
Fig. 4 is a sectional plan of the same, taken on the broken line $x$ $x$ in Fig. 3 and looking upward.
Figure 5:
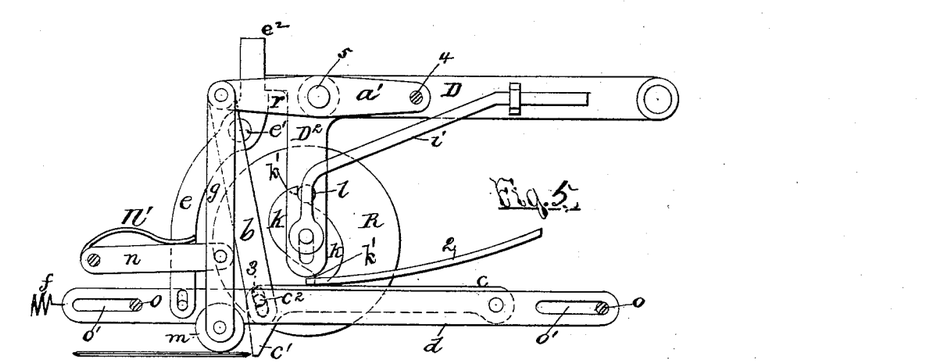
Figs. 5, 6, and 7 are detail views of the canceling devices, showing it in different positions during the progress of its work.
Figure 6:
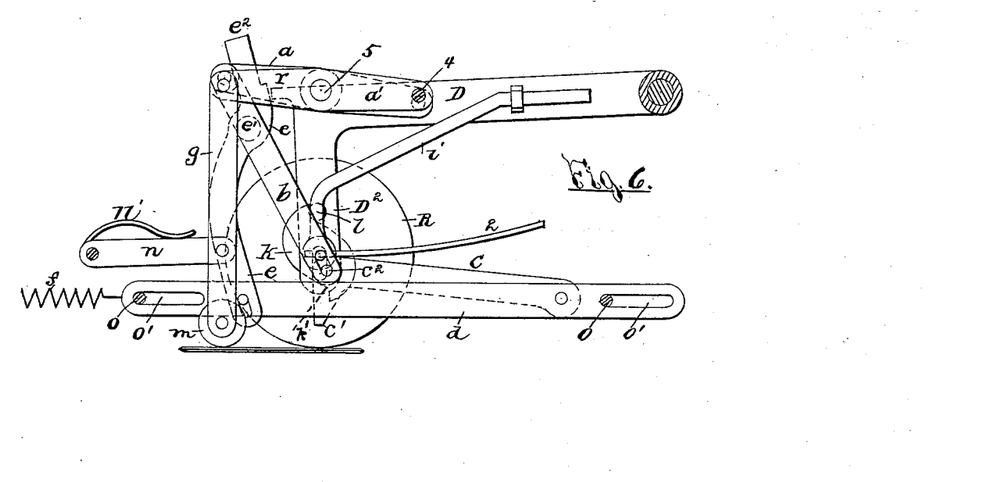
Figures 7, 8:
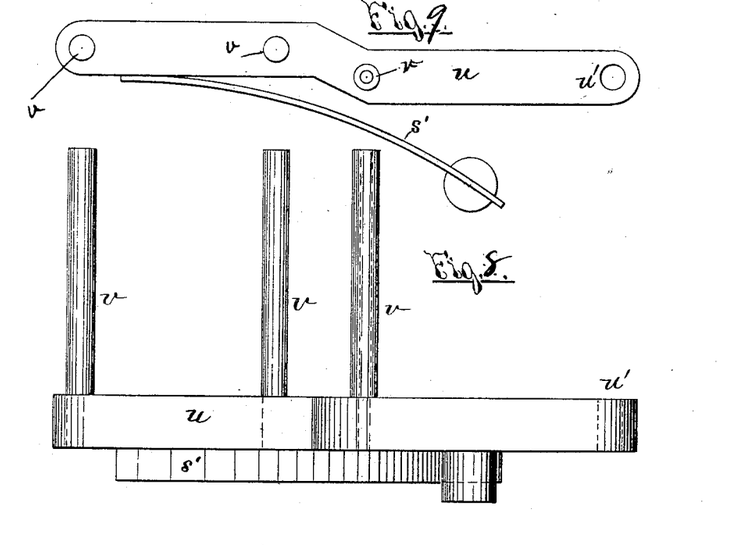
Fig. 8 is a detached side elevation of the arm $u$ and its retaining-spring.
Figure 7:
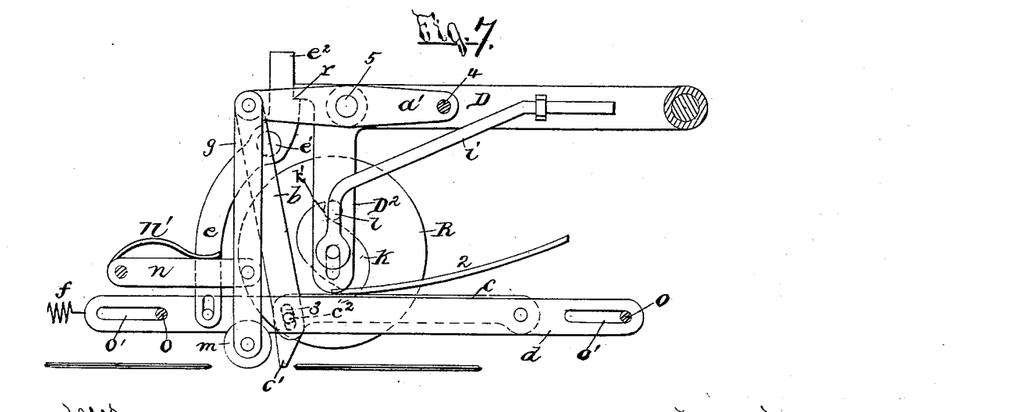

The frame A, to which the marking mechanism is connected, may consist, as shown, of two metal plates, which are connected rigidly side by side far enough apart to contain the mechanism of the marking devices. In the opposite ends of the frame A are pivoted the yokes D D′, which extend toward each other and are formed at their free ends with a downwardly-extending arm $D^2$, reaching nearly to the letter-support. Each of these arms is formed with slots, in which are held the marking-rollers R R′, connected, respectively, with the yokes D D′, as seen clearly in Fig. 4, and held off the letter-support by means of springs $i$ $i$, connected to the yokes at one end and at the other end to the journals of the rollers R R′. Each of the rollers R R′ has secured to its end a cam $k$, which engages a lug or projection $l$ on the arm of the yoke. This cam, as will be seen in Fig. 4, is of such form that when rotated the action of the cam-face on the lug or projection $l$ will crowd the yoke away from the letter-support for the purpose presently described.

Upon the inner side of the frame A at 4 is pivoted a rock-arm $a'$, to one end of which is connected an arm $g$, which extends toward the letter feed or support F and carries upon its lower end a roller $m$, normally engaged with said support by any suitable means, as a spring $n'$. To hold this arm in position without interfering with its action, I provide a link or strap $n$, which is pivoted at one end to the arm $g$ and at the other end to the frame A and effectually prevents the arm and its roller from swinging outward, but permits it to yield freely as the mail-matter passes it. A second rock-arm $a$ is centrally pivoted at 5 upon the arm $a'$ and is at the end 6 connected to the yoke D, its opposite end being connected by a strap or link $b$ with a push-bar $c$, lying substantially parallel with the letter-support. The push-bar $c$ is connected with the connecting strap or link $b$ by a pin $c^2$ on the former engaging an elongated slot 3 in the latter, the purpose of which will hereinafter appear. One end of this push-bar is formed with a finger $c'$, which is held upon the letter-support by a spring 2, as in Fig 4, for making contact with the mail-matter. The opposite end of the push-bar is connected with a slide or moving bar $d$, supported and sliding on pins $o$, which pass through slots in the bar, as at $o'$. A spring $f$, connected to one end of the bar and also to the frame, serves to return the slide to its place after it has been pushed forward, as presently described.

Mounted transversely of the frame A in suitable bearings is a rock-shaft $e'$, on which is rigidly secured a catch-bar $e$, having its free end engaged with the slide $d$, so that the movement of this slide imparts motion to the arm $e$ and its shaft. Projecting upwardly from the shaft $e'$ is a short arm $e^2$, formed with a shoulder $r$, on which the forward end of the yoke D rests when said yoke is in its outward position—that is, moved away from the letter-bed. Another catch-lever L is fulcrumed on a cross-bar P of the frame A, one end of which is formed with a hook $s$ to engage the yoke D', its opposite end being adapted to ride on the end of the yoke D and receive motion therefrom. A spring S, bearing on this lever, holds it at all times in working contact with the yoke D. Springs $t\,t$ are used to draw the yokes D D' toward the letter-support at the proper times.

At each end of the frame A is a roller N, which is normally held in contact with the letter-support by a spring M and is journaled in slots to permit a slight yielding thereof when a thick letter is passing.

Figure 2:
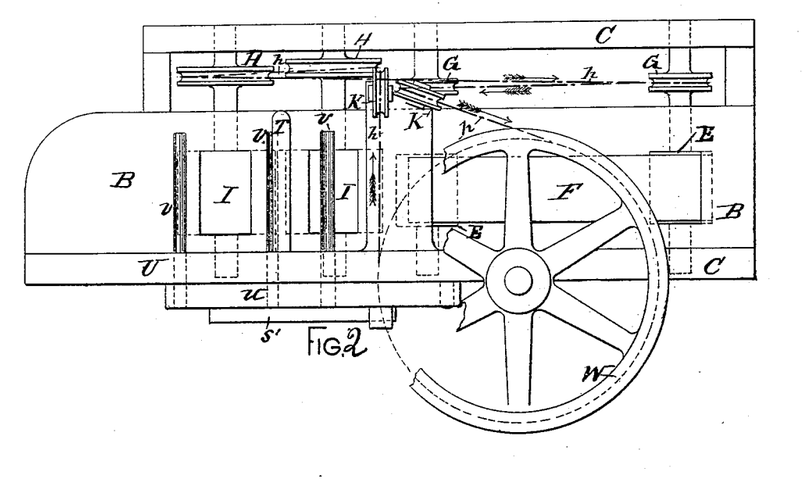
Fig. 2 is an elevation of the machine with the frame A and parts carried thereby removed.
Figure 3:
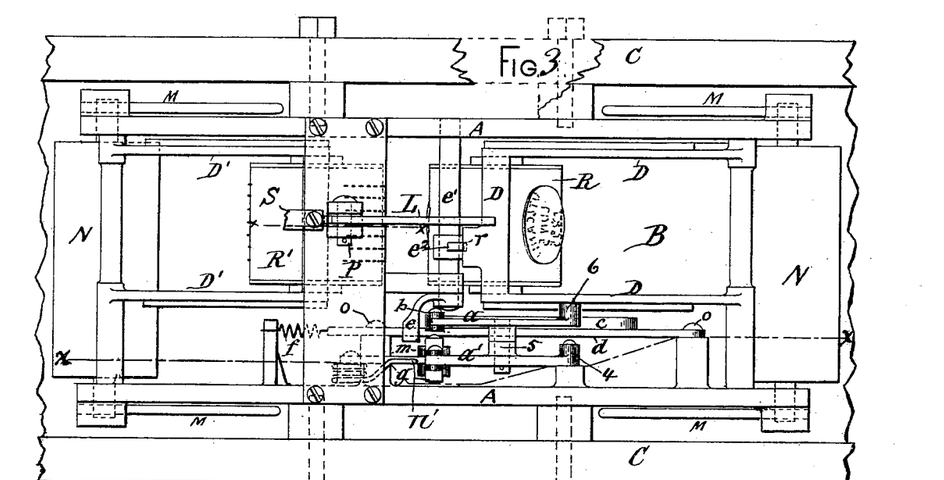
Fig. 3 is a side elevation of the stamping and canceling mechanism, looking toward the letter-support.

The feed mechanism is made self-adjusting, so as to allow only one letter at a time to advance to the stamp or marker in the following manner: A gate T is secured to the base or frame C of the machine between the rollers I I and nearly or quite at right angles to the longitudinal center of the frame C. On the outside of the base C at $u'$ and somewhat lower than the gate T, I pivot one end of a lever $u$, having secured to its free end three transverse fingers $v\ v\ v$, protruding through slots $w\ w\ w$ in the base or frame C of the machine. These fingers are relatively arranged to bring one of them in front of one of the rollers I and the others upon opposite sides of the other roller I, or, in other words, the middle finger lies between the two rollers and the other two substantially opposite the rollers, as will appear in Fig. 2, but the two rear fingers are placed closer together. As a result in holding a tier or package of letters, which rests upon the feed-table U, which, as shown, may form a part of the base or frame C, against the first feed-roller I the letter that is in actual contact with the frictional surface of said feed-roller is drawn in between the gate and roller and thence between the last finger $v$ and the second feed-roller I, by which latter it is fed onward to the bed B, where it is received and carried forward by the endless belt F. In passing the letter between the second feed-roller and its finger $v$ the pressure of the letter against this finger rocks the lever $u$, and thereby carries the other two fingers away from the first feeding-roller, which prevents the next letter from coming into feeding contact with the feed-roller and at the same time closes the passage through the gate T. The last finger $v$, as will be observed upon reference to Figs. 1 and 9 of the drawings, is provided with a small roller journaled on the finger and serves as a drag or retaining roller to prevent more than one letter at a time passing and also by bearing on the letter between it and the feed-roller aids the roller in feeding forward the letter. Thus only one letter can be fed through at a time, and it is not until the first letter has entirely left the second feed-roller I that a spring $s'$ is allowed to return the lever $u$ and its fingers to their normal position, whereupon a second letter is started through with a repetition of this operation. As the letter is carried forward by the belt over the letter-bed B, which aids the belt in supporting the letter, it first passes the small roller $m$ on the end of the arm $g$, and thereby moves this roller and arm off the letter-bed and rocks the pivoted arm $a'$ in a corresponding degree. The second rock-arm $a$ being connected with the first receives movement at the same time, but is prevented from moving the push-bar $c$ to the same extent as the movement of the arm $g$ by reason of the elongation of the hole 3, by which the link $b$ and push-bar $c$ are connected. The contact-finger or engager $c'$ of the push-bar lies near enough to the feed-belt so that it engages the advancing end or edge of the letter as it is moved along over the letter-bed B, and is thereby forced along and carries with it the slide $d$. This movement of the slide swings the catch-lever $e$ so as to rock the shaft $e'$ and disengage the catch $e^2$ from the yoke D, whereupon the yoke is immediately forced toward the belt F and letter-bed B by the spring $t$, and the marker or stamp is thus brought to bear on or against the letter, and by impact on said letter, as will be at once understood, the roller R as it rotates marks or impresses the letter by means of the die or printing-surface which is provided on the face of the roller, the letter-bed B serving as a support while the letter is being marked. As the yoke D approaches the bed B it causes the rock-arm $a$ to move the push-bar $c$ and release it from the letter, thus allowing the sliding bar $d$ to move back to its original position and by means of the catch-lever $e$ move the catch $e^2$ in proper position to reëngage the yoke D. It is thus evident that the push-bar $c$, with its finger or engager $c'$, located in the letter-path, as described, constitutes a contact-finger, which through the medium of its connections, which have been described in connection with the letter, brings the marking-roller R into action in the manner stated. The guide-roller $m$ on the arm $g$ holds and guides the advancing end or edge of the letter up to its encounter with the contact-finger $c'$, and this function is permitted by reason of the peculiar action of the rock-arm $a'$, pivoted at 4 to the frame A, whereby the said arm $a'$ is allowed to move independently of the yoke D. The advancing end or edge of the letter is thereby prevented from crumpling when it encounters the contact-finger. In order to keep the guide-roller $m$ in contact with the letter after the contact-finger or engager has been withdrawn from the letter, which contact is desirable in feeding the letter forward, I pivot the arm $a$ centrally on the arm $a'$, as described, and secure the other end of said arm $a$ to the yoke D, so that when by the action of the spring $t$ said yoke D and the marking-roller are forced to the letter-support for marking the mail-matter the arm $a$ rocks on the pivot 5, which, moving with the yoke, carries the link $b$ outward and withdraws the contact-finger from the letter without disturbing the guide-roller $m$. Consequently by connecting the rock-arms $a$ $a'$ in the manner described I secure an independent movement of the guide-roller and contact-finger or trip. Thus it will be observed that as the letters are fed consecutively or singly over the letter-supporting feed-bed they are guided accurately by the yieldingly-supported arm $g$, carrying the guide-roller $m$, to the contact-finger $c'$ and that the contact of the advancing end or edge of the letter with the contact-finger or engager $c'$ governs the action of the marking-roller R, as described. The arm $g$ and its roller $m$ form a guide, serving to accurately guide the mail-matter to the contact-finger or engager of the push-bar and at the same time serve to stiffen the advancing end or edge of the letter by supporting it in close proximity to the contact-finger at the moment of the engagement of the finger with the letter, thus facilitating an engagement of said finger and letter sufficient to effect the necessary movement or operation of said finger or engager.

In the rotation of the marking-roller R, which, as previously stated, is journaled in slots in the yoke D, the cam $k$ thereon bears upon the lug $l$ and without disturbing the roller R moves the yoke D away from the letter support or bed and forces the yoke past the catch $e^2$ far enough to move the end of the lever L and withdraw the hook $s$ on the opposite end of this lever from its engagement with the yoke D', whereby the marking-roller R' is brought into action. After the yoke D has actuated the lever L through the medium of the roller R as it rotates it springs back upon the shoulder or stop $r$ of the catch $e^2$, by which it is retained in position until again actuated by another letter in the same manner as just described. The inward movement of the yoke D after it is forced outward by the cam bearing against the lug $l$, as described, is very slight and is occasioned by the registration of the depressed portion $k'$ of the cam with the lug $l$, whereupon the spring $i$ returns the die to its former position, it being understood that the roller R has been rotated a sufficient distance, so that its die is in position to commence its registry with the letter immediately when it comes into contact therewith and that said cam and spring thereby form a stop for stopping the action of the roller or marker at the proper point to determine the registry of the die and to insure a like registration of the die with the letter upon a subsequent operation and that the marker R' is brought into printing action on the letter by the rotation of the roller R.

It will be understood, as hereinbefore stated, that the described construction, arrangement, and operation of the feed mechanism and marking mechanism insures the same speed for the marker as the mail-matter being marked independently of the speed of the feed mechanism. In other words, in the form of my invention as shown and described herein the speed of the mail-matter at the time the marking-die comes into action thereon determines the speed of the marking operation independently of the speed at which the mail-matter was started by the feed mechanism. It will also be understood that the points where the die commences and completes its impression, so that the postage stamps will be canceled and the postmarks applied in proper relation to each other, are defined or located by the means described, and by taking advantage of the fact that the stamps upon letter-envelops, postal cards, &c., are universally placed upon the upper right-hand corner. By arranging the marker and its connections in the manner described and feeding the mail-matter thereto with the stamped end extended toward the marker the action of the marker is made uniform and invariable in registering its die or dies on the mail-matter. The letter or other piece of mail-matter is directly utilized in accomplishing this result, since the advancing end or edge serves to time or gage the commencement of the registry, and to this end the feed is made to coöperate with the letter in the manner described, while the determination of the impression is accomplished by the marker and its connections independent of the feed, as previously explained.

The described construction of the marking member and the intermediate connections between the feed and marking members permit the said members to coöperate with each other in acting upon the mail-matter and to act independently if there is any interruption in the feed. Also by this construction the edge of the advancing letter is utilized to control the action of the marking member, so that its die is uniformly and invariably registered without regard to the dimensions of the mail-matter and without smearing the letter-bed when no letters are present.

As will be noted, the cam $k$ on each roller R and R' comprises two projections or cam-surfaces and two corresponding depressions $k'$ $k'$. This is for the purpose that the rollers will make only a half-revolution at each marking operation and then be arrested prior to marking the next letter. While this is the preferable arrangement, it is of course understood that a single cam-surface or a greater number of cam-surfaces for each roller may be employed without departing from the invention. The cam $k$ upon the marking-roller R' moves the yoke D' into engagement with the hook $s$, and this yoke is also reset for another operation. It will be observed that as thus arranged the markers or dies are yieldingly supported away from the letter-path and are intermittently movable thereinto, the object being in this arrangement of the rollers to overcome the smearing of the letter-support by the ink used for marking the letters when no letters are presented by the feed.

In the construction of the mail-marking machine illustrated and described herein I preferably employ two marking-rollers. One of said marking-rollers is intended to carry the stamp-canceling device and the other the postmarking device, and the action of the various parts herein described is so rapid that both marks are readily impressed upon the letter in close proximity and in a perfectly legible manner.

It will be particularly noted that the action of each marker during its rotation is entirely independent of the other and that one is brought into action, as stated, by the engagement of the contact-finger with the letter, while the registration of the die of the second roller is directly controlled by the first roller and the connections between the two. It will also be noted that the peripheral faces of the rollers R R' are movable into and out of engagement with the mail-matter during the registration of the markers and that the peripheral face of the roller R, rotating against the mail-matter, coöperates with the belt engaged with the opposite face of the mail-matter to effect the forward feeding thereof to the printing-point and into position to receive the registration of the marker R'. When the roller R forces its supporting-yoke into engagement with its catch, as previously described, the connections between the rollers R R' operate to bring the marker R' into action, and to thereby control the registration of its die upon the mail-matter in the manner stated. Moreover, it will be particularly observed that the action of the feed and the marker or markers in relation to each other is not only independent, but is also intermittent, as has been previously described, and that the member which is intermittent in its action is automatically controlled by means of the intermediate connections, heretofore described, between said feeding and marking members to determine the registration of the marker or markers upon the mail-matter. Thus in the example of my invention as illustrated the feed member operates continuously when the machine is in operation, and the marking member is normally out of action and is intermittently brought into action when a letter is presented by the feed member to act on each letter. The contact-finger and its connections serve to control the action of the first roller and are arranged relatively to each other, so that the first marker begins to make its impression at the advancing end or edge of the letter and the registration of said impression is defined or determined by the intermediate connections heretofore described, while the first roller and the intermediate connections with the second roller defines and controls the registration of the die of the second roller, as heretofore described.

I do not desire to confine myself to the particular construction of the mechanism shown for connecting the two rollers and for transmitting action from one to the other, as this may be readily changed without in any manner departing from the spirit of my invention, which, as pointed out in the claims, is the automatic cancelation and marking of mail-matter by means of a marking-die, a letter-feed, and mechanism interposed in the letter-path and connected in any suitable manner to the marker, so that the registration of the die or dies is controlled or insured when a letter is presented by the feed; nor do I desire to limit myself to the use of two marking-rollers, as this is shown in the present case merely as a measure of convenience, and both the marking and canceling dies may equally as well be placed upon the same roller and the second roller utilized as a feed-roller to control the registration of the said die-roller, and thus simplify the construction and operation. Neither do I limit myself to the use of both a postmarking and a stamp-canceling marker, as one only may be used and the other be dispensed with or used in a separate machine. I also do not wish to limit myself to the construction of the guide for directing the letter up to the contact-finger, as its construction may be otherwise varied, the only essential being that it must be yieldingly located in suitable relation to the finger or trip for making contact with the mail-matter, so as to support and direct the advancing letter to the finger to insure the contact of the letter with said finger. Neither do I limit myself to the construction of the contact finger or engager, as the same may be greatly varied without changing its function.

Having thus fully described my invention, what I claim is—

1. In a mail-marking machine, the combination of a marker having a die, a feed mechanism, and mechanism for insuring the same speed for the marker as the mail-matter being marked, independently of the speed of the feed mechanism.

2. In a mail-marking machine, the combination of a marker having a die, a feed, and mechanism operated solely from the edge of the mail-matter for insuring proper register of the said mail-matter and die.

3. In a mail-marking machine, the combination of a marker having a die, a feed, and mechanism dependent solely on the edge of the mail-matter for insuring proper register of said mail-matter and die.

4. In a mail-marking machine for automatically marking mail-matter, the combination with a feed member, and a marking member having a die; of means for controlling the registration of the die upon the mail-matter.

5. In a mail-marking machine for automatically marking mail-matter, the combination with a feed member, and a marking member having a die, one of said members being normally out of action; of suitable connections between said members for controlling the action of that member, which is normally out of action.

6. In a mail-marking machine, the combination of a feed, a marker having a die, a support and means connected to the marker for starting and defining the registration of the die.

7. The combination of a feed member, with a marking member having a die, and connections between said members actuated by the marking member to determine the registration of the die of said marking member.

8. In a mail-marking machine, the combination with a feed, a support and a die suitably connected, of means for causing the die to properly register its mark and to act but once on a letter.

9. An automatic mail-marking machine having a marker provided with a die and means connected to the marker for causing the die to register but once on a letter without stopping the letters.

10. A mail-marking machine comprising a feed, a suitably-supported marker having a die, and means connected to said marker for starting the marker when a letter is presented by the feed and for determining the registration of the die.

11. A mail-marking machine comprising a feed for automatically feeding the mail-matter consecutively to the marker, a support for the mail-matter while being marked, a marker having a die, and suitable connections for defining the registration of the die from the advancing edge of the mail-matter.

12. In a mail-marking machine, the combination of a support and a marker suitably connected and provided with means for automatically starting the registration of the marker in relation to the advancing part of the letter, with means connected to and operated by the marker for determining its registration.

13. In a mail-marking machine, the combination of a marker, with suitably-connected means for starting the registration of the marker on the mail-matter at its advancing part and means operated by the marker for defining the registration of the marker.

14. In combination, a marker having a die, a support for the mail-matter while being marked, means for forcing said die and support together, and means for controlling the registration of the die and separating the marker and support.

15. A mail-marking machine for performing the different steps of marking mail-matter automatically, comprising a separator for the mail-matter, a continuously-acting feed member, a marking member having a die normally out of action, and suitable connections between the feed and marking members for controlling the action of the die of the marking member.

16. In a mail-marking machine, the combination of a feed, with a marker, one of said parts operating continuously and the other being normally out of action, a support for the mail-matter, and means connected to the marker for starting and defining the registration of the marker.

17. In a machine for marking mail-matter, the combination with two suitably-supported rollers arranged one in advance of the other, of connections between the two rollers whereby the engagement of the first roller with the mail-matter controls the registration of the second roller with the mail-matter.

18. In a mail-marking machine, the combination with a feed, a supporting-bed, a die-roller and a second roller, of suitable connections between the rollers, whereby the engagement of said second roller with the mail-matter controls the registration of the die-roller therewith.

19. In a mail-marking machine, the combination of a marker, a starting mechanism suitably connected to start the registration of the marker by the encounter of the starting mechanism and mail-matter, said starting mechanism being adapted to move in two planes arranged at an angle with each other and being provided with means for automatically resetting itself to its normal position after the marker has been started.

20. In a mail-marking machine, the combination with a marker; of a starting mechanism suitably connected and adapted to move in two directions when encountered with a letter and through such movements start the registration of the marker on the mail-matter and release the starting mechanism from the mail-matter.

21. In a mail-marking machine, the combination of a marker, a starting mechanism adapted to start the registration of the marker on encountering the mail-matter, said starting mechanism being provided with means for automatically resetting itself to operate on a second letter immediately after the starting mechanism is released from the encounter with the first letter.

22. In a mail-marking machine, the combination of a continuously-acting feed with an intermittently-acting marker having a die, a support for the mail-matter, and suitably-connected means for causing the die to register but once on the letter, substantially as and for the purpose set forth.

23. The combination of a continuously-acting feed with an intermittently-acting marker, a support for the mail-matter while being marked, suitably-connected means in the path of the mail-matter for starting the action of the marker without stopping the mail-matter, and suitably-connected means operated by the marker independently of the mail-matter for determining the action of the marker on said mail-matter, substantially as and for the purpose set forth.

24. The combination in a mail-marking machine; of a letter-feed and a marker having a die, one of said parts operating continuously and the other intermittently, with a support for the mail-matter while being marked, means suitably connected for causing the die to register but once on the letter, said means having a part projecting into the path of the mail-matter to make contact therewith, and means for guiding the mail-matter to the contact part, substantially as and for the purpose specified.

25. In a mail-marking machine, a continuous feed for the mail-matter and a marker normally held at rest, in combination with means for starting the action of the marker, and a stop for arresting the marker in the proper position to accurately mark the following mail-matter.

26. In a mail-marking machine, a continuous feed for the mail-matter and a marker normally held away from the mail-matter, in combination with means arranged to make contact with the mail-matter, and a stop for arresting the marker in the proper position to accurately mark the following mail-matter.

27. In a mail-marking machine, the combination with a feed member for the mail-matter, and a marking member, one of which members is movable toward and away from the other, and a support for the mail-matter; of means for forcing said members together, means for separating said members, a contact-finger connected with one of the members, and arranged to make contact with the mail-matter to govern the contact of the marker with the mail-matter, and means independent of the feed member for controlling the registration of the marking member, substantially as described and for the purpose set forth.

28. In a mail-marking machine, the combination of a marker, a support for the mail-matter, and means for forcing the said parts together, with means for separating said parts after the marker has registered, a contact-finger suitably connected and means for releasing the contact-finger and for resetting said contact-finger in position to encounter a second letter when the marker is in position to register with the first letter, substantially as specified.

29. The combination of a continuously-acting feed with a marker normally out of action when no mail-matter is present, means in the path of the mail-matter suitably connected to start the action of the marker upon the mail-matter, and suitably-connected means operated by the marker for defining the registry of the marker in relation to the advancing part of the mail-matter, substantially as specified.

30. In a mail-marking machine, a support for the mail-matter, in combination with a marker, intermediate mechanism operated by the marker for causing the marker to register but once on the letter after the marker has been started, means extending into the path of the mail-matter for causing said mechanism to act, and mechanism for feeding the mail-matter to said means, substantially as specified.

31. In a mail-marking machine, a feed and a support, in combination with a marker held normally at rest and away from said support, mechanism connected with and operated by said marker to control the operation of the marker on the mail-matter, intermediate mechanism for causing the marker to be moved toward said support to mark the mail-matter, and means extending into the path of the mail-matter for causing said mechanism to act.

32. The combination of feed-rollers for carrying the letters to the marker, a tripping device and suitable connections for bringing the marker into operation as the mail-matter is fed thereto, and means operated by the marker for defining its registration and stopping the action of the marker, substantially as and for the purpose set forth.

33. In a mail-marking machine, a letter-support, in combination with a stamp or marker normally held away from said support, mechanism operated by the marker to control the action of the marker on a letter, a suitably-connected contact-finger extending into the letter-path, and mechanism between the contact-finger and the stamp or marker, whereby the latter is moved toward the letter-support whenever the finger is engaged by a passing letter, substantially as and for the purpose set forth.

34. In a mail-marking machine, a letter-support and a stamp or marker carried by a movable support, which is held normally away from the letter-support, in combination with mechanism connected to and operated by said marker to control its action on a letter, a contact-finger arranged to make contact with the mail-matter and connections operated by said finger to release the marker-support to cause the marker to act upon the letter.

35. In a mail-marking machine, the combination with a letter-supporting feed-bed; of a movably-supported marking-roller, means for bringing the roller into action on the letter, means connected with the roller for stopping its action on the letter after it has registered therewith, and means for resetting the roller for a subsequent operation as the letter is fed from the supporting-bed, substantially as and for the purpose specified.

36. The combination of a letter-feed, a letter-support, a marking-roller, means connected with the marking-roller and operated thereby, and a suitably-connected contact-finger, all connected and arranged to bring the marking-roller into action upon the advancing part of the letter to control the registry of the marking-roller without stopping the letter, substantially as specified.

37. In a mail-marking machine, the combination of a letter-support, a marking-roller normally at rest, a movable support for the roller, means for holding the support in position, a contact-finger suitably connected to said roller-support and arranged to make contact with the mail-matter for causing the marking-roller to be released from the means for holding the support in its normal position, and causing the die to register with the advancing part of the letter, and means for stopping the action of the roller after it has registered, substantially as and for the purpose set forth.

38. A letter-feed and a marker, and means connected with and operated by the marker for controlling the same, in combination with a contact-finger connected with said marker and moving by contact with the letters in the direction of the letter-feed, and out of the letter-path.

39. A letter-feed and a marker, and means connected with and operated by the marker for controlling the same, in combination with a contact-finger connected to said marker, and moving by contact with the letters in the direction of the letter-feed and out of the letter-path, and a spring for forcing the finger toward the letter-path.

40. A mail-marker, a letter-support and means for preventing the action of the marker when no letter is present, in combination with a contact-finger suitably connected so as to release the marker when said finger makes contact with the mail-matter, a spring for forcing the contact-finger toward the mail-matter, and mechanism connected with and operated by the marker for governing its action, substantially as and for the purpose set forth.

41. A mail-marking apparatus comprising a letter-feed, a support for the letter, a marker, means connected to the marker for causing the marker to register from the advancing part of the letter when said marker is brought into action to mark a letter, means suitably connected and arranged to make contact with a letter to bring the marker into action thereon and suitably-connected means independent of the letter for stopping the action of the marker on the letter after it has registered thereon, substantially as and for the purpose set forth.

42. In a mail-marking machine, a letter-feed, a letter-support and a marking-roller, in combination with intermediate mechanism for causing the marking-roller to act upon the letter, means extending into the letter-path for causing said mechanism to act, and a stop for arresting the marking-roller in the proper position to accurately mark the following mail-matter, substantially as described and for the purpose set forth.

43. In a mail-marking machine, a letter-feed, a letter-support and a marking-roller normally held away from the letter-support, in combination with a trip for releasing the roller, and a stop for arresting the marking-roller in the proper position to accurately mark the following mail-matter.

44. A mail-marking apparatus comprising a letter-feed, a support for the mail-matter, a marking device provided with a suitable die, means connected to the marking device for controlling the registration of the marking-die, and means suitably connected and arranged to make contact with the mail-matter, whereby the marking device is brought into action on the advancing end of the mail-matter, substantially as and for the purpose set forth.

45. In a mail-marking machine, a letter-support, in combination with a stamp or marker normally held away from said support, a pivoted yielding contact-finger extending into the letter-path, mechanism between the contact-finger and the stamp or marker, whereby the latter is moved toward the letter-support whenever the finger is engaged by a passing letter; and mechanism connected to and operated by the marker to control the action of the marker on a letter, and reset the same to its normal position, substantially as described.

46. In a mail-marking machine, an oscillatory support, and a marking-roller supported thereby, in combination with means connected to and actuated by the marking-roller for moving said support away from the letter-path, a catch for holding the support away from the letter-path, and a contact-finger connected with said catch and extending into the letter-path to release the catch by contact with the mail-matter, substantially as described, and for the purpose set forth.

47. The combination of a marker carried by a yielding support, a cam connected to the marker for moving the marker-support into its normal position, a catch for holding the marker out of the letter-path, means for moving the marker into the letter-path when its support is released, and a contact-finger suitably connected with said catch and extending into the letter-path to cause the letter to release the marker, substantially as described and for the purpose set forth.

48. The combination of a yieldingly-supported marking-roller, a cam suitably connected thereto for moving the marking-roller support away from the letter-path, means for holding the roller-support out of the letter-path, means for moving the roller and support into the letter-path when released, a movable rod or bar suitably connected to said holding means, for governing the movement of the roller-support, and a contact-finger suitably connected to the rod and adapted to make contact with the mail-matter to operate the movable rod, substantially as described and for the purpose set forth.

49. A marker, a letter-bed, and means for yieldingly forcing the two together, in combination with a catch for holding the two apart, a sliding rod connected with the catch to release the same, and a contact-finger connected with the sliding rod, substantially as described and for the purpose set forth.

50. In a mail-marking machine, a letter-support and a marker, one of said parts being movable with respect to the other, and means for forcing said parts together, in combination with means for separating said parts, a contact-finger suitably connected with the said means and arranged to make contact with the mail-matter to render said separating means inoperative, and means automatically actuated by the marker for defining the registration of the marker and for restoring the latter means to operative position, substantially as described and for the purpose set forth.

51. The combination in a mail-marking machine; of a support for the letter, a marker arranged to operate against the support to mark a letter from its advancing part, means operated independently of the letter for stopping the action of the marker on the letter after it has registered, means operated by the letter for bringing the marker into action, and a feed for automatically presenting the letters to the operating means, substantially as set forth.

52. In a mail-marking machine, a marking-roller normally out of the letter-path, means for holding the said roller out of the letter-path, and a second means for governing the movement of the marking-roller so as to insure registry of the die with the following letter, in combination with a contact-finger, and connections between said finger and the means for holding the marking-roller out of the letter-path, whereby said means is released and the roller allowed to be moved into the letter-path, substantially as described and for the purpose set forth.

53. In a mail-marking machine, a marker for registering with the mail-matter, a spring for moving the marker into action, means for holding the marker out of action, and means for limiting the movement of the marker so as to insure registry with the following letter, in combination with a contact-finger extending into the letter-path, and connections between the same and the means for holding the marker out of action, for releasing the marker.

54. In a mail-marking machine, a letter-support, a marking-roller, a support for said roller, and a spring for yieldingly forcing the roller-support and the letter-support together, in combination with a lever provided with a catch for holding the roller-support away from the letter-support, a contact-finger extending into the letter-path, and connections between the contact-finger and the catch-lever for releasing the same, substantially as described and for the purpose set forth.

55. In a mail-marking machine, a letter-feed and a letter-support, a stamp or marker carried by a movable support which is held normally at rest away from the letter-support, in combination with a trip arranged to make contact with the mail-matter and thus release the movable support to cause the marker to act upon the letter, and mechanism connected with and operated by the marker to control the action of the marker on a letter and reset the marker in its normal position, substantially as and for the purpose set forth.

56. In a mail-marking machine, a letter-support, a marking-roller, a movable support for the marking-roller, and a catch for engaging the roller-support and holding the marking-roller away from the letter-support, in combination with a contact-finger in the letter-path, and connections between the contact-finger and the catch, whereby the latter is tripped by the passing letter, and means, substantially as described, operated by the marking-roller for moving the roller-support away from the letter-path, substantially as and for the purpose set forth.

57. A mail-marking apparatus comprising a letter-feed, a support for the letter, a marker arranged opposite said support, means connected to said marker to cause it to register on a letter placed on said support, means suitably connected and arranged to make contact with a letter on said support, means for guiding the letter to the contacting means, and means for stopping the action of the marker on the letter after the marker has registered, substantially as and for the purpose specified.

58. In a mail-marking machine, a letter-support, in combination with a stamp or marker having a die, intermediate mechanism for causing the die to register on the mail-matter, a contact-finger connected with said intermediate mechanism, and a guide arranged in advance of the contact-finger to prevent crumpling, substantially as and for the purpose set forth.

59. In a mail-marking machine, a letter-feed, in combination with a stamp or marker normally held away from the letter-path, a contact-finger extending into the letter-path, intermediate mechanism between the contact-finger and the stamp or marker whereby the latter is caused to act upon the letter, and a guide yieldingly supported and arranged in close proximity to and in advance of the contact-finger for preventing the letter from crumpling as it engages with the contact-finger.

60. In a mail-marking machine, a marking-roller normally held out of the letter-path, a trip for releasing the roller extending into the letter-path, mechanism operated by the roller for resetting it, in combination with a guide arranged in close proximity to and in advance of the trip for preventing the letter from crumpling as it engages with the trip.

61. A letter-support, a marker normally held out of action, means connected with and operated by the marker to control the registration of the marker after it is brought into action to mark a letter, and a contact-finger, in combination with mechanism between the same and the marker for starting the marker to act against the letter, and a guide device arranged in close proximity to and in advance of the contact-finger adapted to insure the contact of the finger and letter, substantially as described and for the purpose set forth.

62. The combination of a letter-support, a letter-feed, a marker, means connected to the marker for causing the marker to register but once on a letter, said means being provided with a suitably-connected contact-finger, and a guide device arranged in advance of the contact-finger, substantially as and for the purpose specified.

63. The combination, of a letter-support, with two independent markers, and means whereby one of said markers is automatically controlled by the other, substantially as described and for the purpose set forth.

64. The combination, of a letter-support, with two independent markers normally held out of contact with the mail-matter, means whereby the action of one of said markers is controlled by the presence of the mail-matter, and means whereby the action of the other marker is controlled by the first marker, substantially as described and for the purpose set forth.

65. The combination, of a letter-support and two marking-rollers, with a catch-lever between the two rollers, and a contact-finger connected with the first roller so as to trip the same by contact with the mail-matter, and means between the first roller and the catch-lever to release the second roller, substantially as described and for the purpose set forth.

66. A letter-bed and two movable supports, and a marking-roller carried by each support, in combination with a catch for holding the first support away from the letter-bed, a second catch for holding the second support away from the letter-bed and extending into the path of the first support, and a contact-finger extending into the letter-path, and suitably connected with the first catch, substantially as described and for the purpose set forth.

67. The combination, of feed-rollers, as I, I, and a gate as T, with a rock-lever, as U, provided with fingers, as $v\,v$, and a spring, as $s'$, substantially as described and for the purpose set forth.

68. An oscillating support, as D, and a marking-roller mounted therein, in combination with a rock-arm, as $a$, a link as $b$, a push-bar, as $c$, a slide, as $d$, and a catch-lever, as $e$, $e'$, $e^2$, and springs $f$, substantially as described and for the purpose set forth.

69. Two oscillating supports, as D D', two arms, as $a$, $a'$, in combination with a link, as $b$, a push-bar, as $c$, a slide, as $d$, a catch-lever, as $e$, $e'$, $e^2$, a spring as $f$, a lift-arm, as $g$, a rock-lever as L, and a hook, as $s$, all combined to operate, as and for the purpose set forth.

In testimony whereof I have hereunto signed my name and affixed my seal, in the presence of two attesting witnesses, at Syracuse, in the county of Onondaga, in the State of New York, this 13th day of September, 1884.

GEORGE W. HEY. [L. S.]

Witnesses:
FREDERICK H. GIBBS,
MATTHEW J. DOLPHIN.